US011285344B2

(12) United States Patent
Key et al.

(10) Patent No.: US 11,285,344 B2
(45) Date of Patent: Mar. 29, 2022

(54) PERSONAL AIR FILTRATION APPARATUS AND METHOD (71) Applicants: Paul Key, Tucson, AZ (US); Michael Fineberg, Tempe, AZ (US)

(72) Inventors: Paul Key, Tucson, AZ (US); Michael Fineberg, Tempe, AZ (US)

(*) Notice: Subject to any disclaimer, the term of this patent is extended or adjusted under 35 U.S.C. 154(b) by 37 days.

(21) Appl. No.: 16/193,242

(22) Filed: Nov. 16, 2018

(65) Prior Publication Data
US 2020/0155877 A1 May 21, 2020

(51) Int. Cl.
A62B 23/02 (2006.01)
B01D 46/00 (2006.01)
A62B 7/10 (2006.01)
A62B 18/02 (2006.01)

(52) U.S. Cl.
CPC .............. A62B 23/025 (2013.01); A62B 7/10 (2013.01); B01D 46/0005 (2013.01); B01D 46/0089 (2013.01); A62B 18/025 (2013.01); B01D 2279/40 (2013.01)

(58) Field of Classification Search
CPC .............. A61M 16/20; A61M 16/208; A61M 16/0605; A61M 16/0666; A61M 16/0672; A61M 16/06; A61M 16/0468; A61M 2206/11; A61M 2207/00; A61M 15/08; A61M 15/085; Y10T 137/789; A62B 23/00–025; A62B 7/10; A62B 18/025; A62B 18/10; A62B 18/088; A62B 9/02; A62B 23/06; B01D 46/0089; B01D 46/00–0005; B01D 2279/40; A61F 5/56; A61F 5/08; A63B 23/18
See application file for complete search history.

(56) References Cited

U.S. PATENT DOCUMENTS

| 4,630,604 A * | 12/1986 | Montesi | A62B 18/025 128/206.15 |
| 4,981,134 A * | 1/1991 | Courtney | A62B 18/025 128/206.15 |
| 5,267,557 A | 12/1993 | Her-Mou | |
| 10,159,857 B2 | 12/2018 | Key | |
| 2011/0114099 A1 | 5/2011 | Goldstein | |
| 2016/0128863 A1 | 5/2016 | Loomas et al. | |

(Continued)

OTHER PUBLICATIONS

Merriam-Webster, Annular, https://www.merriam-webster.com/dictionary/annular, Accessed Jun. 2, 2020 (Year: 2020).*
(Continued)

Primary Examiner — Elliot S Ruddie
(74) Attorney, Agent, or Firm — Quarles & Brady, LLP (57) ABSTRACT A wearable air filtration apparatus configured to fit beneath a full-face helmet is disclosed. The apparatus includes a front plate including an output aperture and at least one input aperture, the input and output apertures arranged to be substantially front facing when the apparatus is worn by a user. An air filter is arranged behind the front plate and positioned to filter air moving from in front of the apparatus toward the face of a user wearing the apparatus. A valve plate is located behind the filter, the valve plate including an output check valve in fluid communication with the output aperture and at least one input check valve in fluid communication with the at least one input aperture.

15 Claims, 5 Drawing Sheets (56) References Cited

U.S. PATENT DOCUMENTS

2017/0050058 A1     2/2017   Konrad et al.
2018/0043191 A1     2/2018   Huberty et al.
2019/0247682 A1*   8/2019   Sutherland ......... A41D 13/1107

OTHER PUBLICATIONS

Websters, Ring, http://webstersdictionary1828.com/Dictionary/ring, Accessed Jun. 2, 2020 (Year: 2020).*
Morgan, James. Respirator. U.S. Pat. No. 838,434 A, Issued Dec. 11, 1906, U.S. Appl. No. 1906301093A, filed Feb. 14, 1906.
"Annular." Merriam-Webster.com Dictionary, Merriam-Webster, https://www.merriam-webster.com/dictionary/annular. Accessed Sep. 30, 2021.
"Ring." Merriam-Webster.com Dictionary, Merriam-Webster, https://www.merriam-webster.com/dictionary/ring. Accessed Sep. 30, 2021.

* cited by examiner

PERSONAL AIR FILTRATION APPARATUS AND METHOD

TECHNICAL FIELD

The present disclosure relates to an air filtration apparatus and, more particularly, to an air filtration apparatus that can be used underneath a helmet.

BACKGROUND OF THE INVENTION

It is common to perform aerobic activities in areas having diminished air quality. For example, construction work, agricultural field labor and various sporting activities can all require heavy breathing of air that is saturated with dust, smoke or other particulate matter. While various conventional air filtration and respirators exist, these conventional solutions are unsuitable for use during certain high impact aerobic activities. For example, conventional respirators are generally unsuitable for use under full face helmets, e.g., motorcycle helmets, downhill mountain biking and skiing helmets and the like. It would be desirable to provide a compact personal air filtration device capable of being fastened securely, and which offers certain protection for a user at the same time. In particular, it would be desirable to provide a personal air filtration apparatus wearable under a full face helmet that managed air flow in such a way as to take advantage of the rudimentary air passage apertures already present over the mouth area in such full face helmets. The present invention includes these advantages and enables optimal air filtration in a package dimensioned to fit under various types of helmets worn by different users in different types of environments.

SUMMARY OF THE INVENTION

Embodiments of the invention are directed to a personal filtration apparatus that includes a plurality of wing shaped plates that define input and output airflow paths between an external environment and the mouth of the user. The apparatus includes a bite plate by which a user holds the apparatus. The wing shaped plates and the spaces defined therebetween are bent back around the users mouth, thereby conforming to the contours of the user's face. The plates contain input and output apertures on a front facing surface, which allows air to be pulled into the apparatus from the front of the user and expelled out of the apparatus to the front of the user. This arrangement takes advantage of ventilation holes and rudimentary filtering that might be available on conventional full face helmets.

Certain embodiments of the invention provide an apparatus and methods for air filtration. The apparatus includes a front plate and a mouthpiece plate, and a valve plate, which is disposed between the front plate and the mouthpiece plate. The front plate defines a plurality of apertures and the mouthpiece plate defines an aperture. The front and the mouthpiece plates are arranged to allow air to flow through the valve plate between the plurality of apertures in the front plate and the aperture in the mouthpiece plate.

Further, in certain embodiments, each of the plates includes a central portion, and a first and a second wing portion flanking the central portion. The front plate's apertures are located over each of the first and second wing portions, as well as over its central portion. The mouthpiece plate's aperture is located over the central portion. The central portion of the valve plate comprises a first aperture sized containing an intake check valve at one end of the central portion and a second aperture containing an exhaust check valve at an opposite second end of the central portion. Each of the first and second wing portions of the valve plate also includes an aperture containing an intake check valve.

In certain embodiments, the apparatus further comprises a filter, which is in contact with a rear surface of the front plate and a front surface of the valve plate, the filter sized to cover a plurality of input apertures in the front plate, but not an output aperture in the front plate.

In certain embodiments, the mouthpiece plate further comprises an aperture and a breath tube connected to the aperture. The mouthpiece includes a flange or bite plate that is sized to be clenched between the teeth of the user. As a result, a user can securely hold on to the mouthpiece. A ridged portion of the mouthpiece also forms an airtight connection to a ridged portion of the breath tube.

Certain embodiments of the filter are adjustable in several ways to conform to a contour of a user's mouth and chin and to fit underneath a helmet. For example, in certain embodiments, the angles of the wing portions attached to the central portion of the valve plate are adjustable and the distance between the mouthpiece and the body of the apparatus can be elongated or shortened.

In certain embodiments, the apparatus is configured to have at least one intake check valve open so that a user can breathe in air through attached filters and the at least one intake check valve. When a user exhales, the apparatus has at least one exhaust check valve open so the user can breathe out exhaust through the exhaust check valve and the exhaust tube. Further, due to the configuration and placement of the two types of check valves and the exhaust tube exhaled exhaust is not rebreathed by the user.

A user can utilize this apparatus with different configurations for various activities in different types of environment. For example, during bike racing or commuting, a bike rider can use this apparatus to filter out exhaust from cars and other motorcycles; a dirt bike rider can use this apparatus to filter out dust and particles of dirt; during exercise, a user can use this apparatus to breathe in cleaner air and prevent condensate build-up on the filters; and a welder can use this apparatus to protect himself or herself from welding gases and smoke.

BRIEF DESCRIPTION OF THE DRAWINGS

The invention will be more fully understood by referring to the following Detailed Description of Specific Embodiments in conjunction with the Drawings, of which.

DETAILED DESCRIPTION OF SPECIFIC EMBODIMENTS

References throughout this specification to "one embodiment," "an embodiment," "a related embodiment," or similar language mean that a particular feature, structure, or characteristic described in connection with the referred to "embodiment" is included in at least one embodiment of the present invention. Thus, appearances of the phrases "in one embodiment," "in an embodiment," and similar language throughout this specification may, but do not necessarily, all refer to the same embodiment. It is to be understood that no portion of disclosure, taken on its own and in possible connection with a figure, is intended to provide a complete description of all features of the invention.

In addition, the following disclosure may describe features of the invention with reference to corresponding drawings, in which like numbers represent the same or similar elements wherever possible. In the drawings, the depicted structural elements are generally not to scale, and certain components are enlarged relative to the other components for purposes of emphasis and understanding. It is to be understood that no single drawing is intended to support a complete description of all features of the invention. In other words, a given drawing is generally descriptive of only some, and generally not all, features of the invention. A given drawing and an associated portion of the disclosure containing a description referencing such drawing do not, generally, contain all elements of a particular view or all features that can be presented is this view, for purposes of simplifying the given drawing and discussion, and to direct the discussion to particular elements that are featured in this drawing. A skilled artisan will recognize that the invention may possibly be practiced without one or more of the specific features, elements, components, structures, details, or characteristics, or with the use of other methods, components, materials, and so forth. Therefore, although a particular detail of an embodiment of the invention may not be necessarily shown in each and every drawing describing such embodiment, the presence of this detail in the drawing may be implied unless the context of the description requires otherwise. In other instances, well known structures, details, materials, or operations may not be shown in a given drawing or described in detail to avoid obscuring aspects of an embodiment of the invention that are being discussed.

The invention as recited in claims appended to this disclosure is intended to be assessed in light of the disclosure as a whole. The present invention discloses an air filtration apparatus and methods for air filtration. The apparatus can be configured for various types of activities, various types of environment, and various different types of users.

FIGS. 1A-1C and 2-4 illustrate one embodiment of a personal air filtration apparatus 100. The air filtration apparatus 100 comprises a front plate 102, a valve plate 104, and a mouthpiece plate 106. The valve plate 104 is disposed between the front plate 102 and the mouthpiece plate 106. An annular edge/lip 302 (FIG. 3) of the front plate 102 goes over an edge 202 (FIGS. 2 and 3) of the valve plate 104 when the front plate 102, the valve plate 104, and the mouthpiece plate 106 are assembled to form the apparatus 100. In certain embodiments, front plate 102 is formed of a conformable material, whereas valve plate 104 and mouthpiece plate 106 are formed of a rigid material. This allows front plate 102 to act as a gasket that it attached to the rigid valve plate/mouthpiece plate sub-assembly by friction at lip 302. When the valve plate 104 and the mouthpiece plate 106 are assembled together, a chamber 103 is defined between the two plates 104 and 106.

Figure 2:
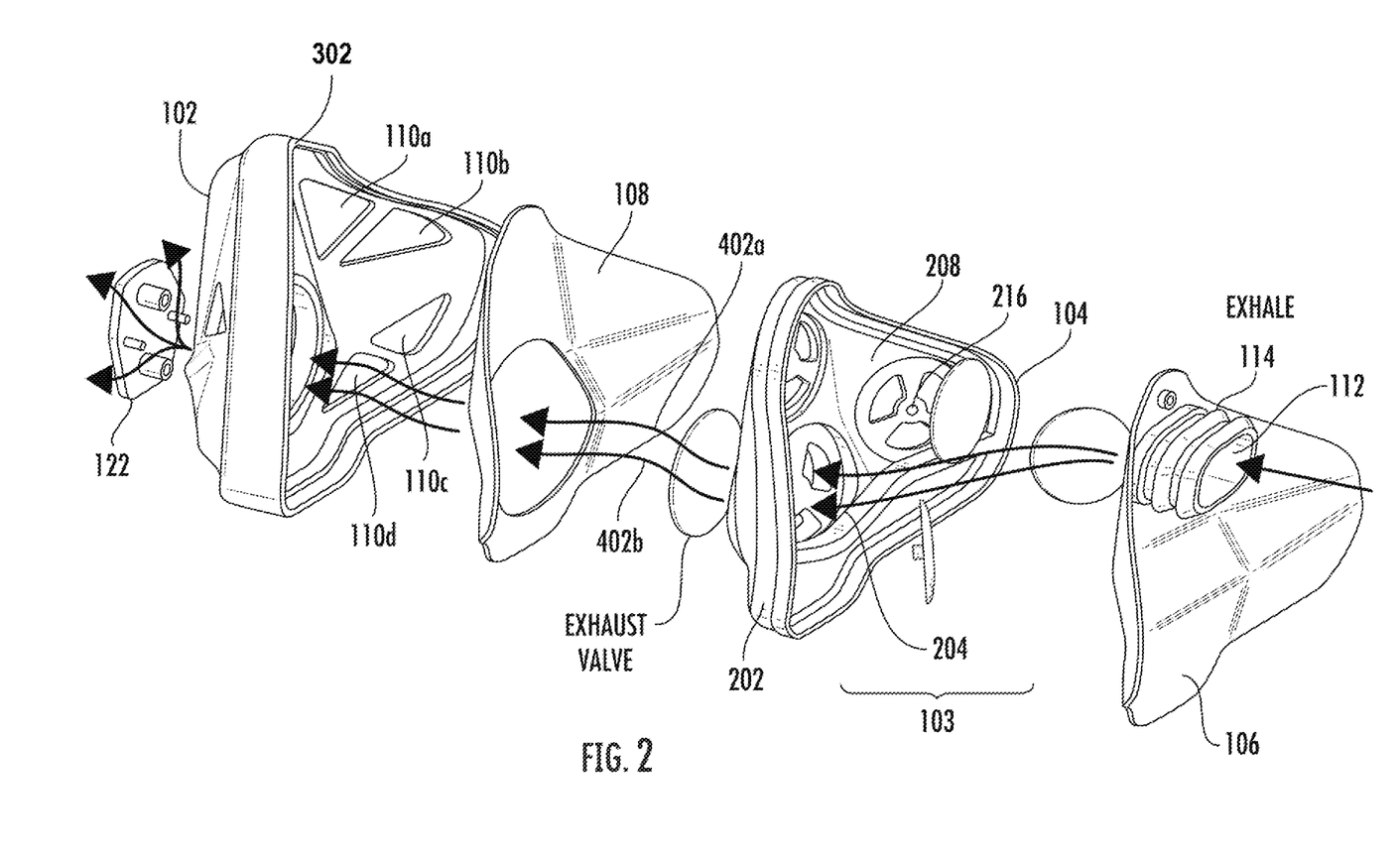
FIG. 2 is an exploded view of the personal air filtration apparatus illustrating egress airflow.
Figure 3:
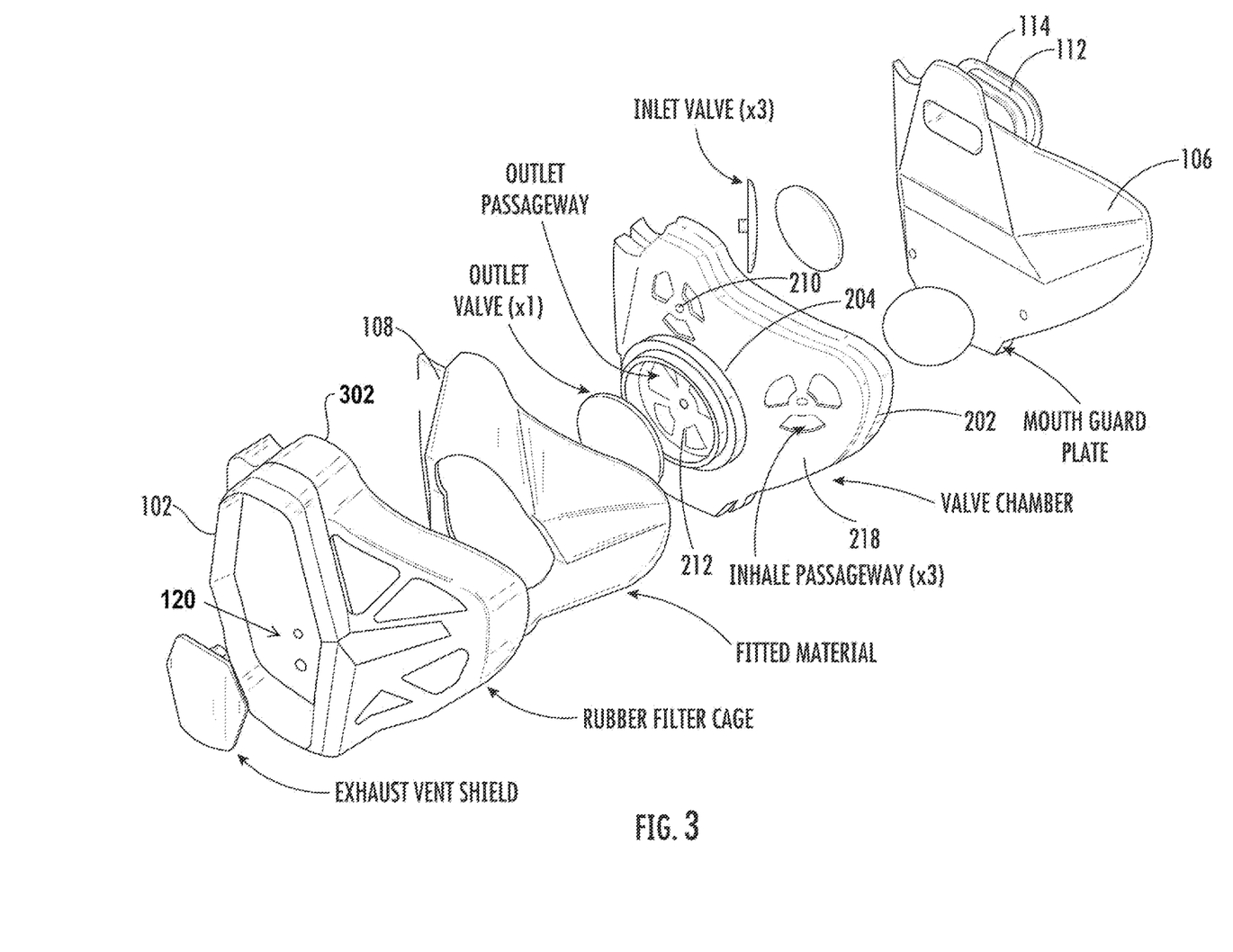
FIG. 3 is another perspective of the exploded view of the personal air filtration apparatus.

Referring to FIGS. 2 and 3, in certain embodiments, the valve plate 104 further comprises a central portion 204, a first wing portion 206, and a second wing portion 208. The wing portions 206 and 208 flank either side of the central portion 204. In certain embodiments, the central portion 204 comprises a first aperture 210 and a second aperture 212. The first aperture 210 houses an intake check valve and the second aperture 212 houses an exhaust check valve. Additionally, each wing portion comprises at least one aperture. The wing portion 206 contains at least one aperture 214 and the wing portion 208 contains at least one aperture 216. The apertures 214 and 216 also house intake check valves. In other embodiments, the central portion 204 comprises an additional aperture configured to dispose an intake check valve. In other embodiments, wing portions 206 and 208 each contain two apertures housing intake check valves. In yet other embodiments, the wing portions 206 and 208 each contain three apertures, each housing intake check valves.

Figure 1A:
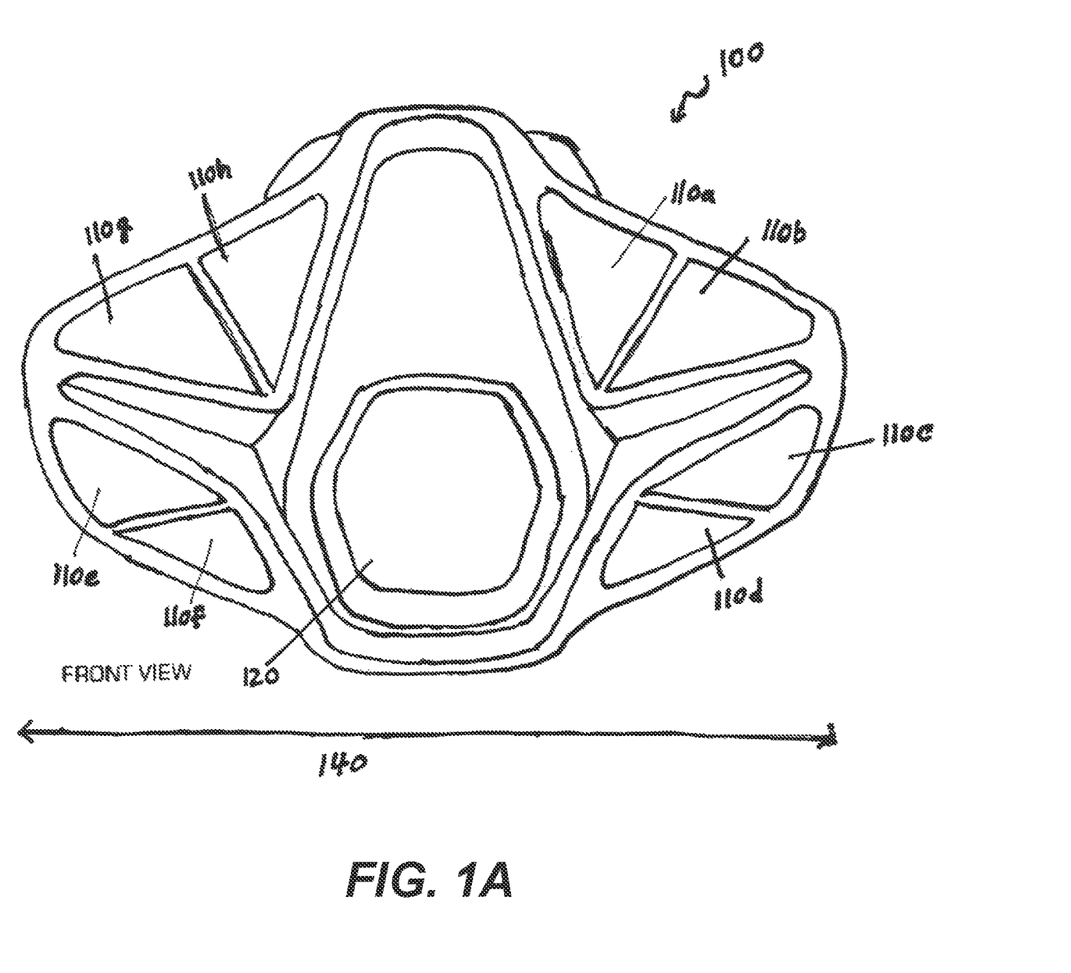
FIG. 1A is a front view of one embodiment of a personal air filtration apparatus.
Figure 1B:
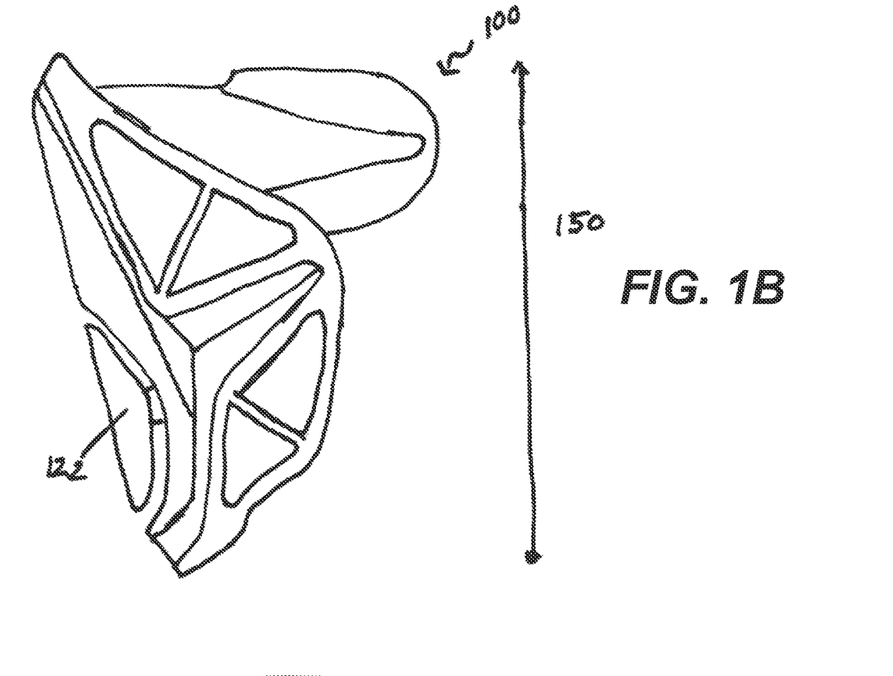
FIG. 1B is a side view of one embodiment of a personal air filtration apparatus.

Referring to FIG. 1A, in certain embodiments, the front plate 102 defines a plurality of input apertures 110a-h and at least one output aperture 120. These input apertures, which in one embodiment are roughly triangular, are also illustrated in FIG. 2. As illustrated in FIG. 1B, the apparatus 100 comprises an exhaust check valve shield 122. The function of the exhaust check valve shield is to protect the exhaust check valve and prevent large debris (e.g., gravel) from entering while still allowing exhaust vapor to flow out of the apparatus, around the edges of the shield. Apparatus 100 further comprises a filter 108 (FIGS. 2-4), which is disposed between the front plate 102 and the valve plate 104. When the apparatus 100 is assembled, the filter 108 is in contact with an inside (rear) surface 304 (FIGS. 2 and 4) of the front plate 102 and with an outside (front) surface 218 (FIG. 3) of the valve plate 104. The filter 108 is sized to cover the plurality of input apertures 110a-h but not the output aperture 120. Similarly, the filter 108 is sized to cover the intake check valves disposed within the central portion 204 and wing portions 206 and 208 of the valve plate 104, but not the exhaust check valve disposed within the central portion 204.

Depending on the need of a user, the user can select appropriate filter materials and thicknesses accordingly. For example, in some embodiments, for a user who is a welder, the filter material is capable of filtering out the toxic welding gases, e.g., activated carbon. In some other embodiments, where the apparatus is to be used where the ambient air is dusty and filled with small size particles, such as, pollen, dirt, mold, pet dander, bacteria, dust mite debris, smoke, or the like, the filter material is effective filtering of dust and small size particles, such as a cotton or fiberglass fiber filter. In some embodiments, filter 108 is impregnated with carbon to remove chemical fumes, gases, cigarette smoke, and odors. The thickness of the filter 108 is selectable according to the need of the user under a certain situation. If more pollutants are in the air, the thickness of filter 108 can be increased to meet a heightened filtering demand.

Figure 1C:
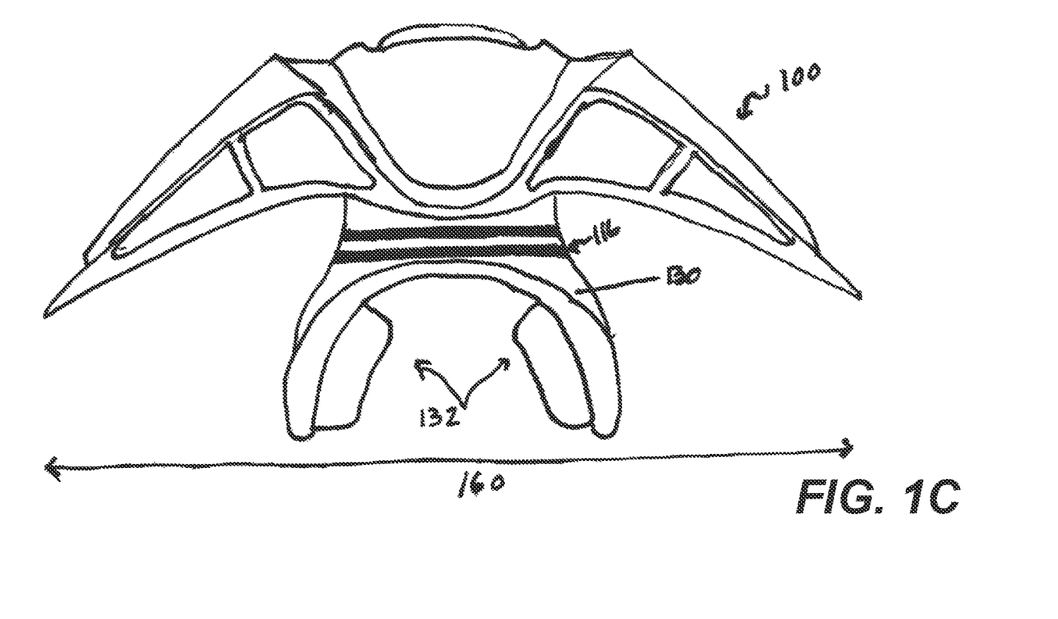
FIG. 1C is a bottom view of one embodiment of a personal air filtration apparatus.

Again referring to FIGS. 2-4, the mouthpiece plate 106 includes an aperture in communication with a breath tube 112. As illustrated in FIGS. 1B and 1C, a mouthpiece 130 is connected to the breath tube 112. In some embodiments, the breath tube 112 and a connecting portion of mouthpiece 130 are both ridged to increase mutual engagement, i.e., where breath tube 112 is a rigid material like plastic and mouthpiece 130 is a conformable material like rubber. Further, the ridged portion 114 of breath tube 112 mates with the ridged portion 116 of mouthpiece 130 to ensure secure attachment. Moreover, the ridged portion 116 of mouthpiece 130 can slide along the ridged portion 114 of breath tube 112, as a result, the distance between the body and the mouthpiece can be elongated or shortened. Other methods known to a person having ordinary skill in the art can be applied to fasten the breath tube 112 and the mouthpiece 130 securely and to adjust the mouthpiece along the breath tube. In certain embodiments, mouthpiece 130 includes a flange that is configured to fit in between a user's upper and lower teeth (e.g., the bite plate 132 depicted in FIG. 1C). As a result, a user can securely hold on to the mouthpiece. Further, the attachment between mouthpiece 130 and breath tube 112 are airtight in order to limit permeation of unfiltered ambient air.

The assembled apparatus 100 as shown in FIGS. 1A-1C is compact yet providing maximum filtering surface at the same time. In certain embodiments, the width 140 (FIG. 1A) of the apparatus 100 has a range from about 4.5 inches to 6.5 inches. The height 150 (FIG. 1B) of the apparatus 100 has a range from about 3 inches to 5.5 inches. Moreover, the depth 160 (FIG. 1C) of the apparatus 100, not including the mouthpiece 130, has a range from about 1.5 inches to 4 inches. In an exemplary embodiment, the apparatus has a width of about 4.2 inches, a height of about 3.8 inches, and a depth of about 2 inches not including the mouthpiece 130. As used herein, "about" represents a plus or minus 10% difference in measurement of the apparatus 100's dimensions. Further, the numerical values of the dimensions disclosed herein are not meant to be limiting. The depth of the apparatus 100 allows comfortable fitting underneath any helmet.

Additionally, the apparatus 100 has a concave shape (toward the user's face) that closely resembles a contour of a user's lower face, as a result, the apparatus 100 fits snuggly to the user's lower face. In certain embodiments, the wing portions 206 and 208 of the valve plate 104 are configured to bend towards the mouthpiece 130 from the central portion 204 of the valve plate. Thus, the valve plate 104 has a concave shape. The front and mouthpiece plates 102 and 106 conforms to such concave shape as well. In certain embodiments, the wing portions 206 and 208 of the valve plate 104 can be adjusted in the degrees of bending towards the mouthpiece from the central portion 204 so that different concave shapes with different degrees can be achieved.

Figure 4:
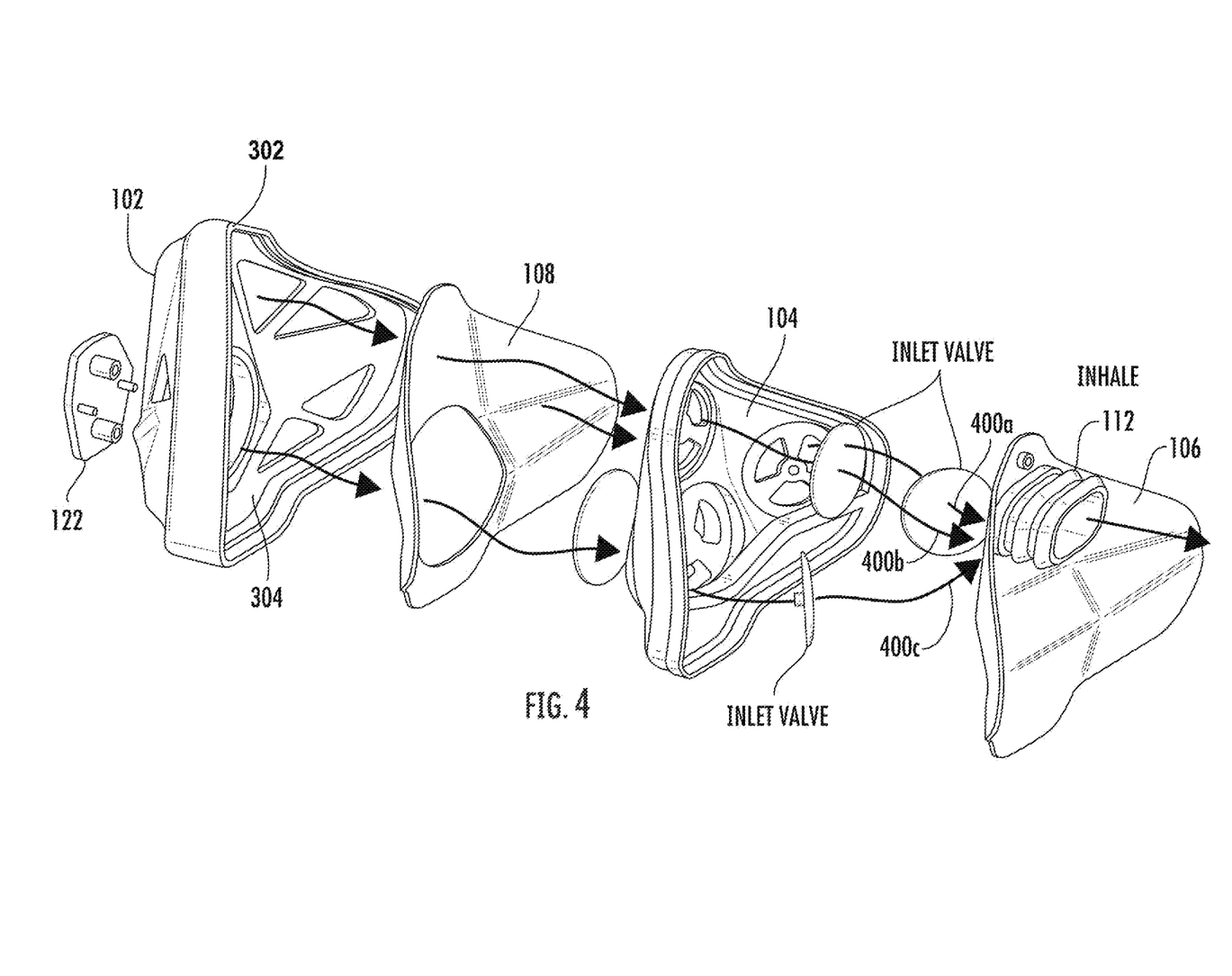
FIG. 4 is the same exploded view of the personal air filtration apparatus as shown in FIG. 2 illustrating ingress airflow.

Even though the apparatus 100 has a compact design, the apparatus 100 is configured to provide a maximum surface for filtering air during an inhale process. Referring to FIG. 4, the plurality of input apertures 110a-h are disposed in a way that allows ingress airflow 400a-c to pass through during an inhale process. After passing through those apertures, the ingress air flow 400a-c go through the filter 108 to remove pollutants and the filtered air flow 400a-c will go through the plurality of intake check valves disposed in the valve plate 104 for further filtration. The plurality of input apertures 110a-h and the filter 108 are configured to allow a maximum ingress of airflow during the inhale process. In addition, the breath tube 112 connected to the mouthpiece plate 106 through an aperture is disposed in a way to allow maximum ingress airflow when a user inhales through the breath tube 112. Moreover, suitable cracking pressures of the intake check valves are selected to be disposed within the valve plate 104. Suitable cracking pressures for an intake check valve mean that the intake check valve allows gas to flow in under a negative pressure induced by a typical inhalation restricted by filter 108. Suitable cracking pressures for an exhaust check valve are also selected to ensure that the exhaust check valve remains closed during the inhale process.

Referring to FIG. 2, when a user exhales through the breath tube 112 during an exhale process, egress airflow 402a and 402b passes through at least one exhaust check valve disposed in aperture 212. The at least one exhaust check valve is disposed within the central portion 202 of the valve plate 104 in a way to allow the egress airflow 402a and 402b to pass through during exhale. Further, the at least one output aperture of the front plate 102 is disposed in a way to allow the egress airflow to pass through after it passes through the exhaust check valve. In addition to the aforementioned, the suitable cracking pressures of an exhaust check valve are selected so that the exhaust check valve opens under a positive pressure from the exhale through the breath tube 112. The selected cracking pressures of the intake check valves ensures them to remain closed during the exhale process. As illustrated in FIGS. 2 and 4, the ingress airflow 400a-c and the egress airflow 402a and b have separated pathways during an inhale and exhale respectively. With this design, condensation problems caused by a difference in temperature of the ingress air and egress air can be minimized. As a result, the filter 108 can stay dry and effective for air filtration for a prolonged period of time. Additionally, because the input and output apertures are located at the front of the device, the device takes advantage of any existing ventilation holes or rudimentary filtering that may exist in the mouth area of a conventional face shield or full face helmet.

In some embodiments, durable and lightweight materials are utilized to build the current air filtration apparatus 100. When the air filtration apparatus is both durable and light, the apparatus satisfies many needs in different types of activities.

While the preferred embodiments of the present invention have been illustrated in detail, it should be apparent that modifications and adaptations to those embodiments may occur to one skilled in the art without departing from the scope of the present invention.

We claim:

1. An apparatus for air filtration, comprising:
   a front plate including an output aperture and at least one input aperture, the input and output apertures arranged to be substantially front facing when the apparatus is worn by a user;
   an air filter arranged behind the front plate and positioned to filter air moving from in front of the apparatus toward the face of a user wearing the apparatus;
   a valve plate located behind the filter, the valve plate including an output check valve in fluid communication with the output aperture, and at least one input check valve in fluid communication with the at least one input aperture, the output check valve configured to unidirectionally allow air to flow in a forward direction, and the at least one input check valve configured to unidirectionally allow air to flow in a rearward direction;
   wherein the valve plate comprises a flat central portion, and two wing portions that are bent rearwardly from the flat central portion, the flat central portion defining an aperture containing the output check valve and an aperture containing a central input check valve, and wherein the input check valve is located adjacent to and spaced apart from the output check valve; and
   a breath tube in fluid communication with the output check valve, the central input check valve and the at least one input check valve.

2. The apparatus of claim 1, further including a mouthpiece plate behind the valve plate, wherein the mouthpiece plate defines a breath tube aperture in fluid communication with the breath tube, and wherein the mouthpiece plate and the valve plate, together, define a chamber providing fluid communication between the breath tube and the valves.

3. The apparatus of claim 2, wherein the mouthpiece plate includes a flat central portion, and 2 two wing portions that are bent rearwardly from the flat central portion, and wherein the breath tube aperture is defined in a rearward facing surface of the flat central portion.

4. The apparatus of claim 1, further including a bite plate attached to, and behind, the breath tube.

5. The apparatus of claim 1, wherein the central input apertures and the output aperture of the front plate are located in a front facing surface of the front plate.

6. The apparatus of claim 5, wherein a portion of the front facing surface is convex.

7. The apparatus of claim 6, wherein the front facing surface includes a flat central portion, and two wing portions that are bent rearwardly from the flat central portion.

8. The apparatus of claim 7, wherein the central portion of the front plate contains the output aperture.

9. The apparatus of claim 8, wherein each wing portion of the front plate contains one of the at least one input apertures.

10. The apparatus of claim 1, wherein the filter is arranged behind the at least one input aperture of the front plate, but not the output aperture.

11. The apparatus of claim 1, wherein the front plate is formed of a conformable material such that the front plate operable to act as a gasket and operable to be secured to a lip of the valve plate by friction.

12. The apparatus of claim 11, wherein the front plate includes a rearwardly extending annular lip that engages and secures the filter.

13. The apparatus of claim 1, further including a cover arranged in front of the central input aperture and spaced off of the front plate so as to permit air flowing out of the output aperture to flow out and around the edges of the cover.

14. The apparatus of claim 13, wherein the cover is configured permit air to flow out and around the edges of the cover in all possible directions such that at least some of said air flowing out of the output aperture is free to escape in an upward or cranial direction from the perspective of a user wearing the apparatus.

15. The apparatus of claim 1, wherein each wing portion of the valve plate define an aperture containing one of the at least one input check valves, respectively.

* * * * *